(12) United States Patent
Wang et al.

(10) Patent No.: US 7,675,270 B2
(45) Date of Patent: Mar. 9, 2010

(54) SYSTEM AND METHOD FOR RELIABLE INFORMATION HANDLING SYSTEM AND BATTERY COMMUNICATION

(75) Inventors: Ligong Wang, Round Rock, TX (US); Kendall C. Witte, Austin, TX (US); Fu Sheng Tsai, Northboro, MA (US)

(73) Assignee: Dell Products L.P., Round Rock, TX (US)

( * ) Notice: Subject to any disclaimer, the term of this patent is extended or adjusted under 35 U.S.C. 154(b) by 204 days.

(21) Appl. No.: 12/112,667

(22) Filed: Apr. 30, 2008

(65) Prior Publication Data

US 2009/0273312 A1    Nov. 5, 2009

(51) Int. Cl.
*H02J 7/04* (2006.01)
*H02J 7/16* (2006.01)

(52) U.S. Cl. .................... 320/162; 320/128; 320/134; 320/164

(58) Field of Classification Search .................. 320/106, 320/107, 128, 134, 162, 164
See application file for complete search history.

(56) References Cited

U.S. PATENT DOCUMENTS

| | | | | |
|---|---|---|---|---|
| 4,929,880 A | * | 5/1990 | Henderson et al. | 320/134 |
| 5,606,242 A | * | 2/1997 | Hull et al. | 320/106 |
| 5,633,573 A | * | 5/1997 | van Phuoc et al. | 320/128 |
| 5,691,621 A | * | 11/1997 | Phuoc et al. | 320/134 |
| 5,710,501 A | * | 1/1998 | van Phuoc et al. | 307/150 |
| 5,796,239 A | | 8/1998 | Van Phuoc et al. | |
| 5,841,996 A | * | 11/1998 | Nolan et al. | 710/305 |
| 6,009,247 A | | 12/1999 | Canora et al. | |
| 6,104,967 A | | 8/2000 | Hagen et al. | |
| 6,421,235 B2 | | 7/2002 | Ditzik | |
| 2007/0170888 A1 | * | 7/2007 | Hioki | 320/107 |

* cited by examiner

*Primary Examiner*—Edward Tso
*Assistant Examiner*—Ramy Ramadan
(74) *Attorney, Agent, or Firm*—Hamilton & Terrile, LLP; Robert W. Holland

(57) ABSTRACT

Communication between an information handling system and battery has improved reliability by repeated communications of information from the battery using different commands from the information handling system. A battery management unit responds to a first command from an information handling system by sending information stored at a first address associated with the command and then saving the first address at second address. A power manager of the information handling system sends a second command having the second address to the battery management unit. The battery management unit responds to the second command by retrieving the first address stored at the second address, retrieving information stored at the first address and sending the information to the power manager. The power manager restricts operations of the battery, such as charges or discharges, unless the information received in response to the first and second commands matches.

17 Claims, 3 Drawing Sheets

SYSTEM AND METHOD FOR RELIABLE INFORMATION HANDLING SYSTEM AND BATTERY COMMUNICATION

BACKGROUND OF THE INVENTION

1. Field of the Invention

The present invention relates in general to the field of information handling system power, and more particularly to a system and method for reliable information handling system and battery communication.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have developed over time, manufacturers have generally strived to put as much processing capability as possible in as small of a housing as possible. These efforts led not only to the development of small information handling systems but also to the development of portable information handling systems. Portable information handling systems are built into a housing having a compact size that allows end users to operate the system on the go. To facilitate operation on the go, portable information handling systems typically include an integrated display, keyboard and power source. Typically, portable information handling systems have a clamshell configuration with an LCD panel integrated in a lid that is rotationally coupled to a base. When the lid rotates to an open position, the keyboard and display panel are exposed to accept user inputs and display system outputs. A rechargeable battery typically inserted as a module of the housing base provides power to processing components located in the base and to the display. Portable information handling systems also run on external power provided from AC adapters that plug into an AC power socket, convert AC power into DC power and plug into a socket formed in the information handling system. Power from the power adapter is used to recharge the battery under the management of a controller of the information handling system, such as an embedded controller, also commonly referred to as a keyboard controller.

One difficulty with portable information handling systems is that operation free of an AC power adapter is limited by the amount of charge carried by the battery. Information handling system manufacturers generally attempt to balance operating time available from a battery charge with the size of the battery. For example, a large battery will offer a longer charge life but generally requires a larger chassis size. In order to maximize charge life of an information handling system battery, the battery typically includes some intelligence, such as a microprocessor and firmware, that manages battery charges and discharges and provides the information handling system with basic battery operating characteristics, such as current and voltage. Battery intelligence helps the information handling system manage battery charge and also helps to ensure that the charging and discharging process will occur in a safe manner. In some instances, an incorrect or unauthorized battery inserted in an information handling system could result in damage to the battery or the information handling system. However, in some instances, miscommunication between the battery and the information handling system could potentially allow an incorrect or unauthorized battery to operate in an information handling system.

SUMMARY OF THE INVENTION

Therefore a need has arisen for a system and method which manages charging and discharging of an information handling system using messaging having enhanced reliability.

In accordance with the present invention, a system and method are provided which substantially reduce the disadvantages and problems associated with previous methods and systems for communicating between an information handling system and a battery. The battery creates a pointer in local memory that stores the address of an information handling system command. The information handling system sends a command with the pointer to verify the information provided from the battery in response to the initial command. The battery responds to the command having the pointer by reading the address stored in the pointer and providing the information handling system with the value stored at the address read from the pointer.

More specifically, an information handling system having plural processing components is powered by a rechargeable battery. A power manager running on an embedded controller of the information handling system sends a command having a memory address to the battery. A battery management unit of the battery finds the information stored in the requested address, stores the requested address in a pointer address, and returns the requested information to the power manager. Upon receipt of the information, the power manager sends a second command to that battery that includes the pointer address. In response, the battery management unit finds the initial address stored in the pointer address, finds the information at that initial address and returns the information to the power manager. The power manager compares the information returned in response to the first and second commands and allows or disallows operations at the battery based on the relationship between the responses. For example, if the responses match, the power manager allows a charge of the battery, and if the responses do not match, the power manager disallows a charge of the battery.

The present invention provides a number of important technical advantages. One example of an important technical advantage is that communication between an information handling system and battery is performed with enhanced reliability. Communication errors are reduced by comparing multiple messages sent between the information handling system and battery from multiple locations. Enhanced communication reduces the risk of use of incorrect information to perform charging and discharging of the battery. In addition, enforcing multiple messages to verify communications reduces the risk that an incorrect or unauthorized battery will work in the information handling system. For example, unauthorized batteries that do not use a pointer address, such as 2eh, will return values in response to the pointer address that do not match the value read from the previous command so that the information handling system will not charge the unauthorized battery.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Verified communications between a battery and information handling system help to ensure that battery operations will occur under proper control of the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
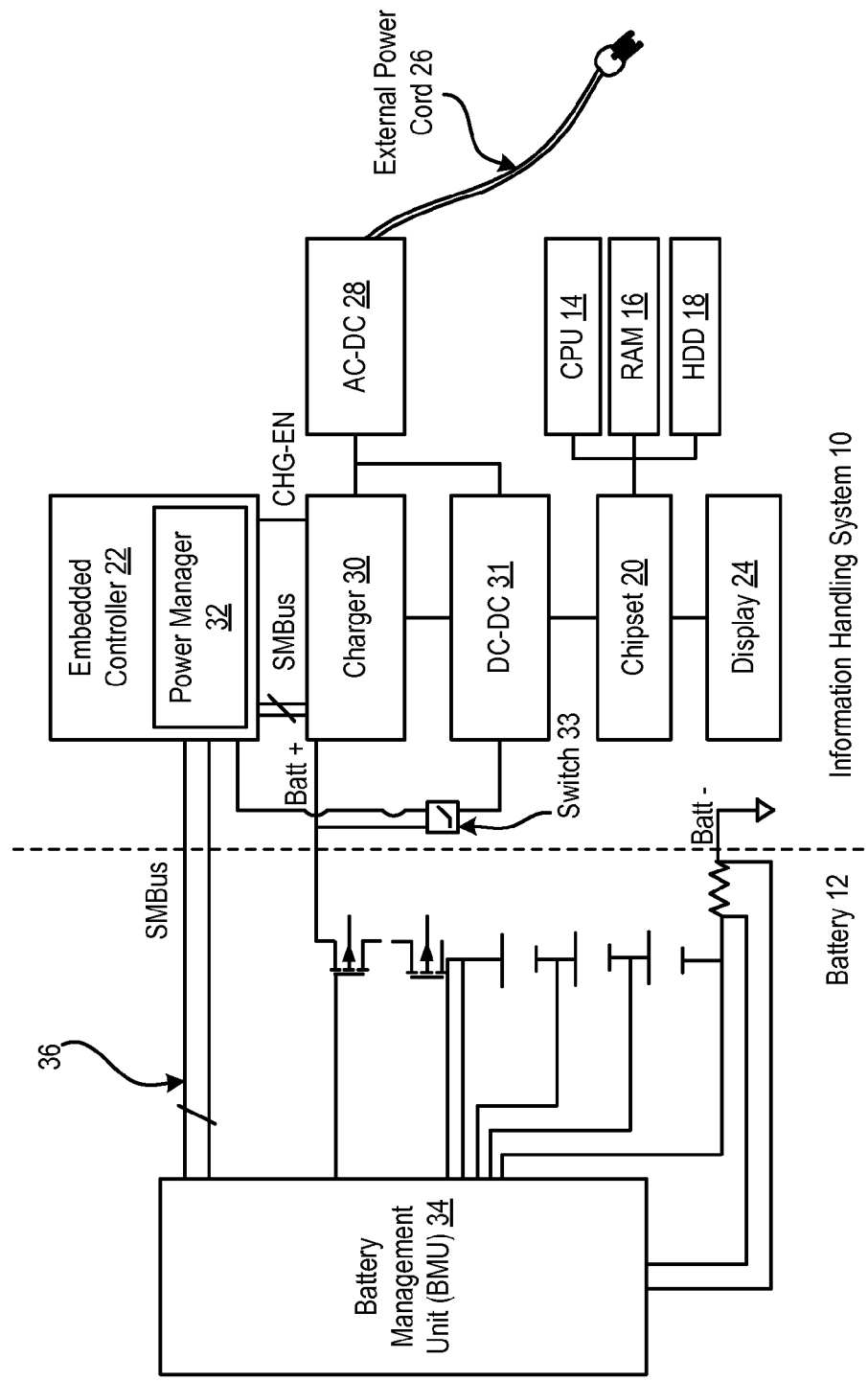
FIG. 1 depicts a block diagram of an information handling system and battery having verified communications of information between the battery and the information handling system.

Referring now to FIG. 1, a block diagram depicts an information handling system 10 and battery 12 having verified communications of information between the battery 12 and the information handling system 10. Information handling system 10 has a variety of processing components that cooperate to process information, such as a CPU 14, RAM 16, a hard disk drive 18, chipset 20 and embedded controller 22. An integrated display 24 interfaces with the processing components to present information as visual images. The processing components and display are powered by either an external power cord 26 and AC to DC converter 28 that provides power through charger 30 or by battery 12 that provides power through a DC-DC converter 31 in charger 30. When external power is available through external power cord 26, battery 12 charges with power available after power is applied to the processing components. When external power cord 26 is disconnected, battery 12 discharges to provide power to the processing components through a DC-DC converter within charger 30. A power manager 32 running on embedded controller 22 manages charges and discharges of battery 12 by communicating with a battery management unit 34 through a management bus 36 and a controlling switch 33.

In order to verify communications between power manager 32 and battery management unit 34, power manager 32 and battery management unit 34 cooperate to send repetitive messages that are compared for discrepancies that indicate a miscommunication. In the example embodiment, a pointer in battery management unit 34 provides repeated reads of information from a memory in response to different commands from power manager 32, however, repeated communications may also be used to verify information sent from power manager 32 to battery management unit 34. Verification starts with an initial command from power manager 32 to battery management unit 34 that includes a memory address of memory that has information desired by power manager 32. Standard commands to a battery management unit can be generally modeled as named memory locations with store 2 bytes of information. The memory locations are mostly read only, although some are write only and some are read-write. Communication of a memory address from power manager 32 to battery management unit 34 causes battery management unit 34 to retrieve information from the memory address and return the information to power manager 32. For example, power manager 32 retrieves voltage or current information by sending the address for the desired information to battery management unit 34, which responds by sending the information in the requested address.

Verified communications are accomplished by adding pointer functionality in battery management unit 34 and initiating a pointer read with power manager 32. Upon receipt of a memory address, battery management unit 34 responds by finding the information in memory stored at the specified address and then storing the specified address in a pointer address, such as address 2eh. For example, a request for current stored at an address of "14h" results in retrieval of the current and storage of the address of "14h" in address 2eh. When power manager 32 receives the current information, it sends a second command, this time specifying memory address 2eh. Battery management unit 34 responds to the command by retrieving the address information stored in address 2eh, in this example the address of "14h", and then finding the information stored in that address, in this case current stored in "14h". Battery management unit 34 responds to the 2eh command by returning the current stored in address "14h" based on the address information stored in address 2eh. Once power manager 32 receives the response to the 2eh command, power manager 32 compares that value with the value received in response to command "14h" to see if the values match and/or verify if the value received in response to command 2eh as an integer is in a desired range. If the values fail to match, battery operations are restricted, such as by disabling a charge or discharge of battery 12. If the values match, the battery is validated and battery operations are allowed to proceed, such as by allowing a charge or discharge. Comparing the response to the different commands helps to avoid systemic errors, such as extended rise/fall times. For example, at least four bits are opposite between 2eh (101110) and 14h (010100). For instance, 2eh becomes CycleCount( ) 17h (010111) and 14h turns to Current (0) 0Ah (1010) if the rise time is out of SMBus specifications, such as might happen in the event of high capacitance on the bus.

Figure 2:
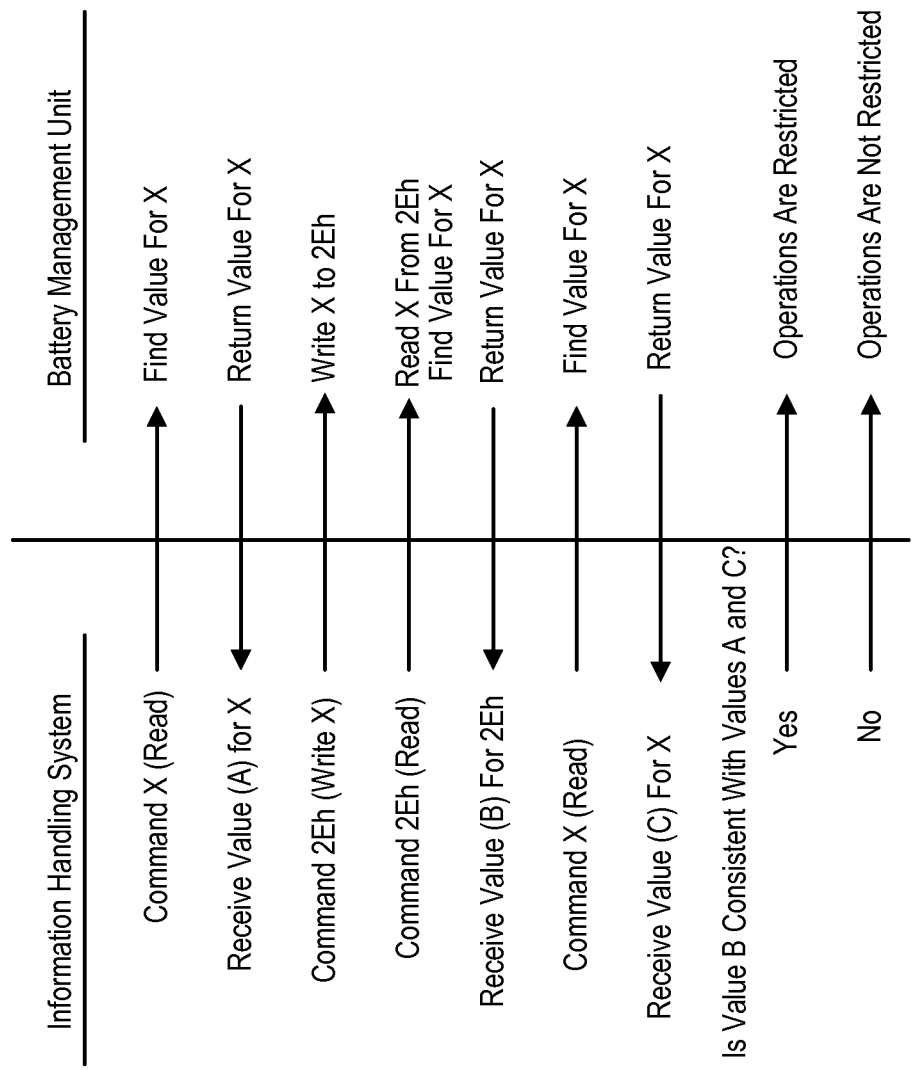
FIG. 2 depicts a flow chart of verified communications between an information handling system and battery.

Referring now to FIG. 2, a flow chart depicts verified communications between an information handling system and battery. The flow initiates with a command X sent from the information handling system to the battery to read a value stored at address X in the battery. Upon receipt of command X, the battery management unit finds the value stored at X and returns the value stored at X to the information handling system. Upon receipt of the value A stored at X, the information handling system writes X in high byte plus other information at low byte, if applicable, with the command 2eh to the battery. The battery management unit writes X to address 2eh, after which the information handling system commands a read of 2eh. The battery management unit responds to a command to read 2eh by applying X to find the value stored at address X, and then returning the value stored at X to the information handling system, which the information handling system stores as value B. In alternative embodiments, the battery management unit can automatically write address information to 2eh rather than performing a write of address information by the information handling system. The information handling system then commands a read of X from the battery management unit, which returns the value stored at X to the information handling system as a value C. Upon receipt of the value stored at X, the information received in response to the commands X and the command 2eh are compared. If the values A, B, and C received in response to commands X and command 2eh have a predetermined relationship, such as a match or values within a desired range, then the information handling system authorizes battery operations, such as charges and discharges. If the values received in response to command X and command 2eh do not have the predetermined relationship, then the information handling system restricts battery operations, such as by disallowing charges and discharges. The consistency of the value B with Values A and C take into account that the value stored at address X may change over time. Although FIG. 2 depicts a flow of multiple commands from the information handling system to the battery, multiple commands might also be required from the battery to the information handling system.

Figure 3:
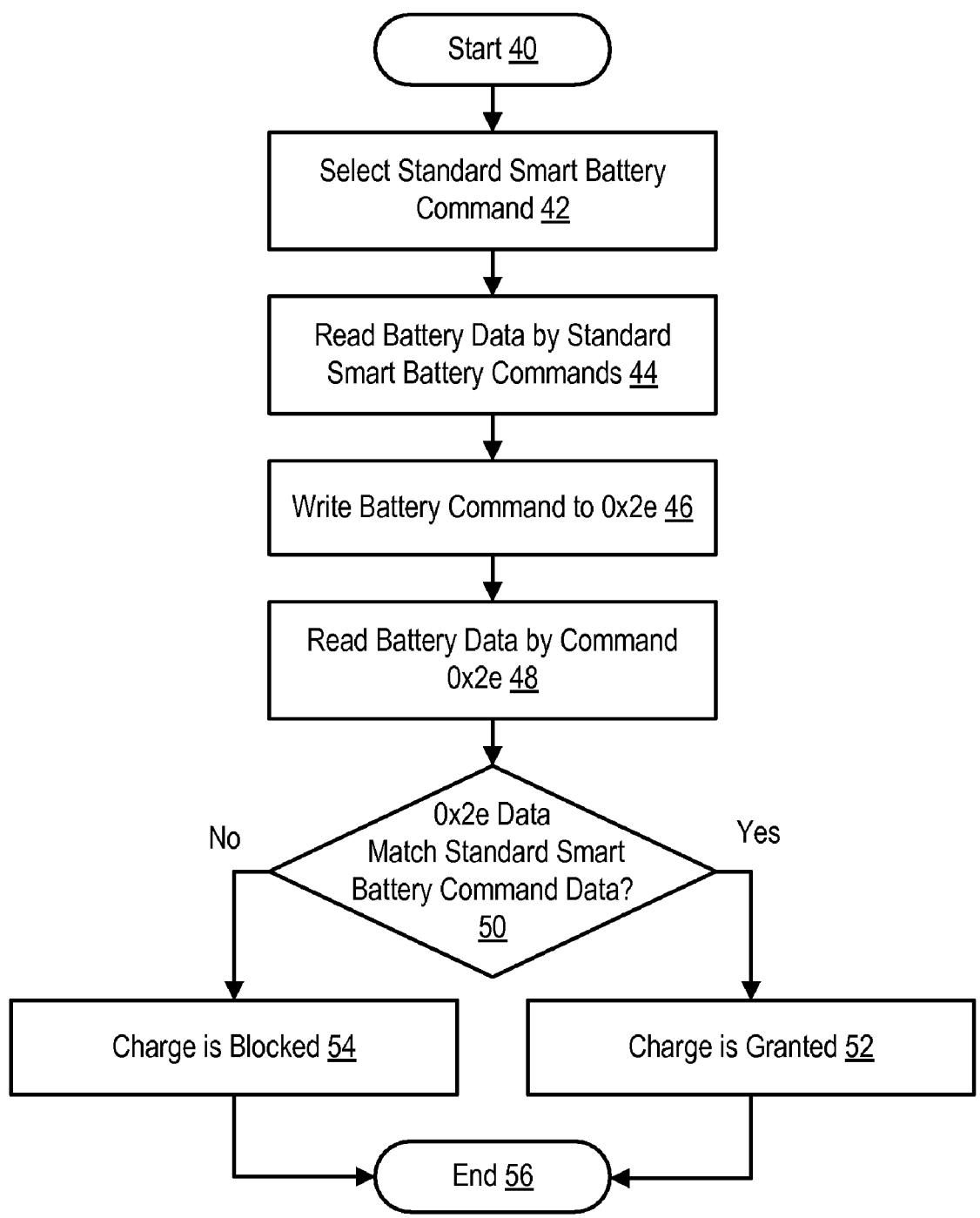
FIG. 3 depicts a flow diagram of a process for verified communications between an information handling system and battery.

Referring now to FIG. 3, a flow diagram depicts a process for verified communications between an information handling system and battery. The process starts at step 40 and continues to step 42 with selection of a standard smart battery command for communication to the battery. At step 44, the battery data is read by the standard smart battery command issued from the information handling system to the battery. At step 46, the battery writes the command to an address 0x2e in the battery memory. At step 48, the information handling system reads data from the battery with the 0x2e command, which causes the battery to read the address stored in address 0x2e and reply with the information stored in the address read from 0x2e. At step 50, a determination is made of whether the data read with the 0x2e command and the previous standard smart battery command are a match. If yes, the process continues to step 52 to grant authorization for a charge of the battery. If no, the process continues to step 54 at which a charge of the battery is blocked. The process ends at step 56. In alternative embodiments, all or just selected commands communicated between the information handling system and battery are verified with multiple reads.

Although the present invention has been described in detail, it should be understood that various changes, substitutions and alterations can be made hereto without departing from the spirit and scope of the invention as defined by the appended claims.

What is claimed is:

1. An information handling system comprising: a housing; plural processing components disposed in the housing and operable to process information; a battery disposed in the housing and operable to power the processing components; a battery management unit disposed in the battery an operable to manage battery operations, the battery management unit having memory with plural addresses, each address storing a battery parameter; a management bus interfacing the battery management unit with the processing components; and a power manager running on a processing component, the power manager operable to retrieve predetermined information from the battery management unit with a first command, to retrieve the predetermined information from the battery management unit with a second command and to restrict an operation of the battery unless the predetermined information from the first command matches the predetermined information from the second command; wherein the first command comprises a first address, the battery management unit further operable to reply to the first command with a value stored in the first address and by storing the first address at a second address.

2. The information handling system of claim 1 wherein the operation restricted by the power manager comprises a charge of the battery.

3. The information handling system of claim 1 wherein the operation restricted by the power manager comprises a discharge of the battery.

4. The information handling system of claim 1 wherein the predetermined information comprises voltage associated with the battery.

5. The information handling system of claim 1 wherein the predetermined information comprises current associated with battery.

6. The information handling system of claim 1 wherein the management bus comprises an SMBus.

7. The information handling system of claim 1 wherein the second command comprises the second address, the battery management unit further operable to reply to the second command by retrieving address information stored at the second address, retrieving information stored at an address indicated by the address information and sending the information retrieved from the address indicated by the address information to the power manager.

8. The information handling system of claim 7 wherein the second address comprises 2eh.

9. A method for communicating between a battery and an information handling system, the method comprising: sending a first command from the information handling system to the battery, the first command comprising a first address; looking up information at the battery stored at the first address; writing the first address at a second address; sending the information stored at the first address to the information handling system in response to the first command; sending a second command from the information handling system to the battery, the second command comprising the second address; looking up information at the battery stored at the second address; applying at the battery the information stored at the second address to lookup information stored at the first address; sending the information stored at the first address to the information handling system in response to the second command; comparing at the information handling system the responses to the first and second commands; and restricting an operation at the battery unless the responses to the first and second commands have a predetermined relationship.

10. The method of claim 9 wherein writing the first address to a second address further comprises sending a command from the information handling system to the battery to write the first address to the second address.

11. The method of claim 9 wherein the operation comprises charging the battery.

12. The method of claim 9 wherein the operation comprises discharging the battery.

13. The method of claim 9 wherein the information stored at the first address comprises a voltage value associated with the battery.

14. The method of claim 9 wherein the information stored at the first address comprises a current value associated with the battery.

15. A system for communicating between a battery and an information handling system, the system comprising: memory having plural addresses, each address associated with predetermined information; and a battery management unit interfaced with the memory and operable to communicate with an information handling system bus, the battery management unit further operable to receive a first command from the information handling system, the command having a first address, to retrieve information stored at the first address, to send the information to the information handling system and to store first address information at a second address; wherein the battery management unit is further operable to receive a second command from the information handling system, the second command having the second address, to retrieve the first address information, to apply the first address information to retrieve information stored at the first address and to send the information stored at the first address to the information handling system in response to the second command.

16. The system of claim 15 further comprising a power manager associated with the information handling system, the power manager operable to compare the information received in response to the first and second commands to allow or disallow an operation associated with the battery.

17. The system of claim 16 wherein the information stored at the first address comprises a voltage associated with the battery.

* * * * *